United States Patent

Oh et al.

[11] Patent Number: 5,919,280
[45] Date of Patent: Jul. 6, 1999

[54] METHOD FOR FABRICATING SILICA GLASS

[75] Inventors: Jeong-hyun Oh, Kyungsangbuk-dong; Young-min Baik, Kyungsangbuk-do, both of Rep. of Korea

[73] Assignee: Samsung Electronics Co., Ltd., Suwon, Rep. of Korea

[21] Appl. No.: 09/122,627

[22] Filed: Jul. 27, 1998

[30] Foreign Application Priority Data

Jul. 29, 1997 [KR] Rep. of Korea ............ 97-35698
May 27, 1998 [KR] Rep. of Korea ............ 98-19262

[51] Int. Cl.$^6$ .................... C03B 8/00; C03B 37/016; C03B 3/04
[52] U.S. Cl. ................ 65/17.2; 65/395; 65/440; 501/12; 501/53; 501/54
[58] Field of Search ............. 65/17.2, 395, 396, 65/426, 427, 440, DIG. 8; 501/12, 53, 54

[56] References Cited

U.S. PATENT DOCUMENTS 4,426,216  1/1984  Satoh et al. .
5,240,488  8/1993  Chandross et al. .
5,292,801  3/1994  Avnir et al. .

FOREIGN PATENT DOCUMENTS 63-117917  5/1988  Japan .
1-176234   7/1989  Japan .
2113200    1/1982  United Kingdom .

*Primary Examiner*—Steven P. Griffin
*Attorney, Agent, or Firm*—Leydig, Voit & Mayer

[57] ABSTRACT

A method for fabricating a silica glass is provided. The method includes the steps of adding silica and a dispersant to a premix solution obtained by dissolving an acrylic resin monomer and a cross-linking agent in distilled water, dispersing the mixed solution and adjusting the pH of the mixture, to form a sol. Air bubbles are removed from the sol, and then the resultant sol is aged. A polymerization initiator and a catalyst are added to the aged sol, and the pH of the reaction mixture is adjusted. The reaction mixture is poured into a mold, and then the mixture is gelated, aged, demolded, dried, and then thermally treated to remove organic substances. Hydroxy groups are eliminated and the gel is sintered. A high purity silica glass tube, substantially free of cracking after drying and having a low shrinking ratio can be obtained. Also, a large silica glass tube can be manufactured by this fabrication method.

9 Claims, 1 Drawing Sheet

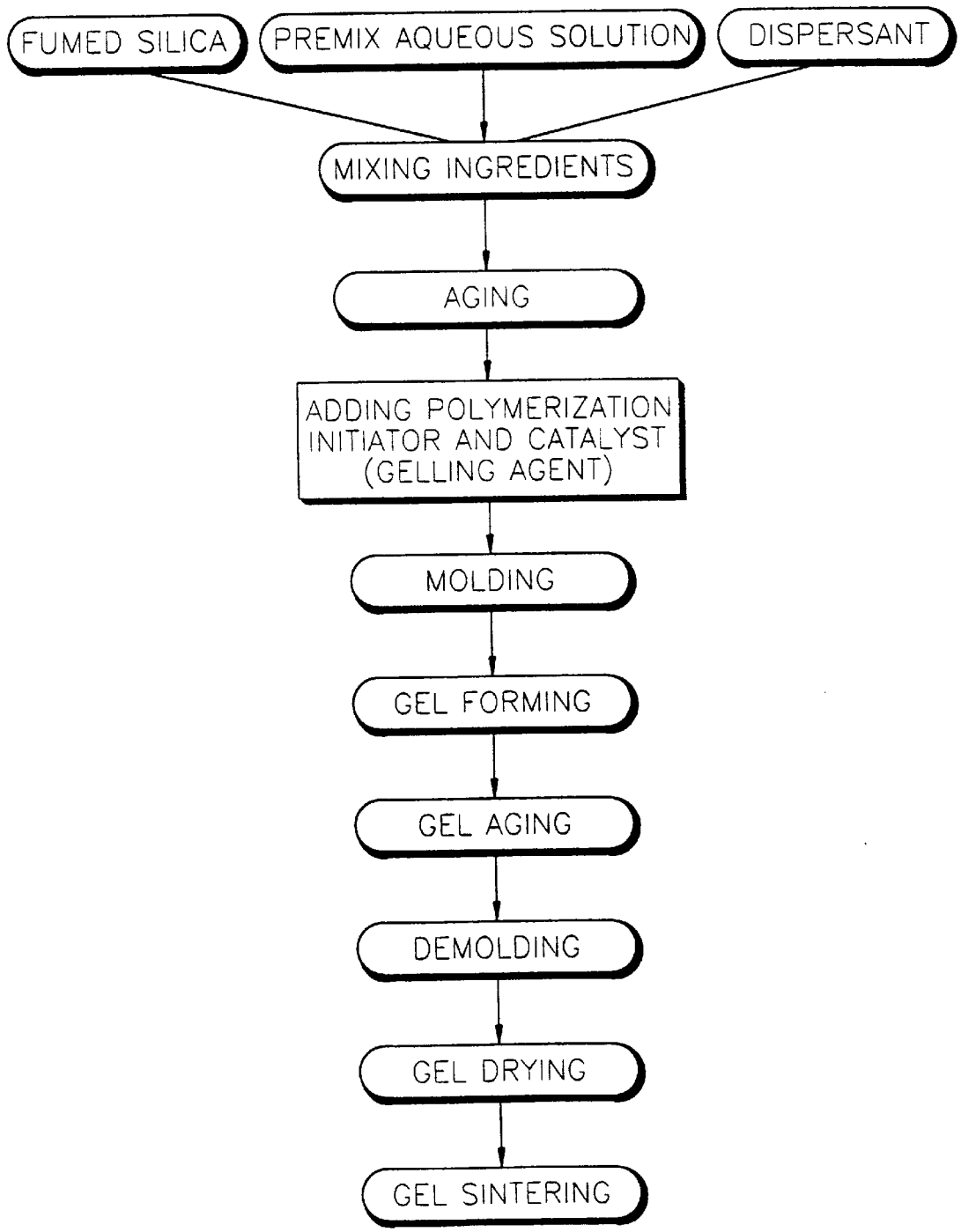

METHOD FOR FABRICATING SILICA GLASS

BACKGROUND OF THE INVENTION

1. Field of the Invention

The present invention relates to a method for fabricating a silica glass by a sol-gel process.

2. Description of the Related Art

In general, silica glass is transparent and chemically inert, and has high a level of thermal stability and strength, and a low thermal expansion coefficient. Because of such characteristics, silica glass has been useful for an optical device such as an optical fiber or optical lens.

Basically, an optical fiber is comprised of a core at the center thereof, and a cladding having a refractive index different from the core such that light is totally reflected from the core. In order to fabricate optical fibers, an optical fiber preform including a core rod and an overcladding tube enclosing the core rod is prepared. Then, the optical fiber preform is thermally-treated and then extended to form the optical fibers.

The optical fiber preform is prepared by a modified chemical vapor deposition (MCVD), vapor phase axial deposition (VAD) or outside vapor deposition (OVD) method.

In MCVD, the optical fiber preform is prepared from an overcladding tube made of high purity silica glass. Here, the silica glass overcladding tube is formed by a sol-gel process.

The productivity can be increased and the composition of the product can be controlled when using a sol-gel process as a liquid phase process. Also, because the sol-gel process is performed at a low temperature, the sol-gel process is very economical. Also, since a high purity material is used as the starting material, this method is very useful for fabricating a photomask for semiconductor and a high purity silica glass.

Hereinafter, a method of manufacturing an overcladding tube formed of silica glass by the sol-gel process will be briefly described.

First, silica particles are dispersed in water to form a sol. The formed sol is subjected to an aging treatment for a predetermined time. Then, the resultant sol is poured into a mold for gelation. After gelation is completed, the gel is separated from the mold and then dried.

Then, the dried gel is thermally-treated to remove organic substances from the gel. Then, a reaction for eliminating hydroxy groups from the resulting gel and sintering are performed, thereby producing an overcladding tube made of silica glass.

The reactivity of the above-described sol-gel process depends on the gelation reaction temperature, composition of the sol, pH and solvent, and it is very difficult to maintain the reactivity within a favorable range by controlling such factors. Also, when drying the molded gel, many cracks can form, and shrinking and cracking occur during sintering. In order to solve these problems, a method using a drying control chemical additive (DCCA) or a polymer binder, or a redispersion method and supercritical drying method have been developed.

The method using DCCA minimizes local differences in the solvent's evaporation rate from the gel, thereby minimizing the differences in the local stress of the samples during drying. As a result, the gel becomes hard, thereby decreasing the generation of cracks.

According to the redispersion method, dried fine silica powder, i.e., fumed silica, is dispersed in water to form a sol, and then the sol is gelated. During gelation, the silica particles form an agglomerate due to hydrogen bonds. After drying the agglomerate, the dried agglomerate is subjected to a thermal process and a grinding process and then is redispersed in water. The redispersed product is gelated, molded, and then sintered.

However, the above methods are not effective in preventing cracking during the drying of the gel, and the preparing process is complicated.

SUMMARY OF THE INVENTION

To solve the above problems, it is an objective of the present invention to provide a method for fabricating a high density silica glass, in which cracking after drying is suppressed, and cracking and shrinking after sintering process are reduced.

Accordingly, to achieve the above objective, there is provided a method for fabricating a silica glass comprising the steps of:

(a) adding silica and a dispersant to a premix solution obtained by dissolving a monomer for an acrylic resin and a cross-linking agent in distilled water, dispersing the mixed solution, and adjusting the pH of the mixture to form a sol;

(b) removing air bubbles from the sol, and then aging the resultant sol;

(c) adding a polymerization initiator and a catalyst to the aging-treated sol, and adjusting the pH of the reaction mixture;

(d) pouring the reaction mixture into a mold, and then gelating the mixture;

(e) aging the obtained gel;

(f) demolding the aging-treated gel, and then drying the demolded gel;

(g) thermally-treating the dried gel to remove organic substances from the gel; and (h) performing a hydroxy group elimination reaction and a sintering reaction on the gel from which organic substances have been removed.

BRIEF DESCRIPTION OF THE DRAWING

The above objective and advantages of the present invention will become more apparent by describing in detail preferred embodiments thereof with reference to the attached drawing in which:

The FIGURE is a flowchart illustrating a method for fabricating a silica glass according to the present invention.

DESCRIPTION OF THE PREFERRED EMBODIMENTS

In a method for fabricating silica glass according to the present invention, chemical gelation can occur when silica is added to a premix solution obtained by dissolving a monomer for an acrylic resin and a cross-linking agent in water, and the resultant is dispersed and polymerized. Thermal gelation can occur when a gelling agent is added to a composition used for making silica glass and pH of the resultant is properly adjusted. These operations can be simultaneously performed. As a result, a polymer binder having a 3-dimensional network structure, formed from the monomer for acrylic resin and the cross-linking agent, is evenly distributed in the whole gel, so that problems in conventional sol-gel processes, e.g., a density gradient, can be suppressed. Also, the strength of the gel increases, thereby suppressing cracking during drying and decreasing the drying time.

Preferably, the content of the monomer for an acrylic resin is 2~20 wt % based on the weight of the premix solution, and the content of the cross-linking agent is 0.05~1.0 wt % based on the weight of the premix solution.

Preferably, the concentration of the premix solution containing the monomer and the cross-linking agent is low. If the concentration of the premix solution is low, carbon does not remain after organic substances are decomposed during the sol-gel process. Further, the transparency of the silica glass does not deteriorate after sintering. Also, if a dilute premix solution is used, the moist gel becomes smooth, and the strength of the moist gel can be improved through thermal gelation by controlling the pH.

The acrylic resin monomer and the cross-linking agent are not specifically restricted. However, the acrylic resin monomer is preferably at least one of acryl amide or methacryl amide, and the cross-linking agent is preferably N,N'-methylenebisacrylamide (($H_2C{=}CHCONH)_2CH_2$).

A method for fabricating a silica glass according to the present invention will be described with reference to the FIGURE.

First, an acrylic resin monomer and a cross-linking agent are dissolved in deionized water to prepare a premix solution. Fumed silica and a dispersant are added to the premix solution, and are then dispersed, and the pH of the reaction mixture is adjusted to 11~13, thereby forming a sol. Preferably, the mixing ratio of the silica and the premix solution is 4:6~6:4 based on weight.

Then, air bubbles are removed from the sol using a vacuum pump, and the sol is aged for a predetermined time to stabilize silica particles of the sol.

Then, a polymerization initiator and a catalyst are added to the reaction mixture, and a gelling agent is further added if required. Then, the pH of the reaction mixture is adjusted to 9~11. The obtained mixture is poured into a mold for gelation. Here, N,N,N',N'-tetramethylenediamine (TEMED) Is preferably used as the catalyst.

Then, after aging the gel at room temperature, the moist gel is demolded, and then dried in an incubator at 20~50° C. and a relative humidity (RH) of 70~95%. Then, the gel is heated to 300~700° C. at a rate of 50° C. per hour in air and is maintained at that temperature for 2~8 hours. Then, the temperature is increased to 800~1,200° C. at a rate of 100° C. per hour under a chlorine gas atmosphere, and the gel is thermally-treated at that temperature for 1~8 hours. The temperature is increased to 1,100~1,500° C. at a rate of 100° C. per hour under a helium gas atmosphere, and the gel is thermally-treated at that temperature for 1~8 hours, thereby forming a silica glass tube.

Examples of the method for fabricating silica glass according to the present invention will be described. However, the present invention is not limited to the following examples.

EXAMPLE 1

14.0 wt % of acryl amide and 0.6 wt % of N,N'-methylenebisacrylamide were dissolved in 85.4 wt % of deionized water to prepare a premix solution.

500 ml of the premix solution, 500 g of the fumed silica (Aerosil OX-50, Degussa Co.) and 52 ml of trimethylammonium hydroxide (TMAH) aqueous solution (25.0 wt % solution in water) were mixed and dispersed using a high shear mixer to prepare a sol. Then, air bubbles were removed from the sol using a vacuum pump, and aged for 15 hours. 6 ml of ammonium persulfate aqueous solution (5.0 wt % solution in water) as a polymerization initiator, and 2 ml of TEMED as a catalyst were added to and mixed with the aging-treated sol.

The mixture was poured into a mold for gelation. After 30 minutes, the obtained moist gel was demolded, and dried in an incubator at 30° C. and 90% RH for 4 days. Then, the gel was heated to 100° C. at a rate of 10° C. per hour, and maintained at that temperature for 10 hours to remove the remaining moisture, thereby forming a dried gel.

Then, after heating the dried gel to 600° C. at a rate of 50° C./hour, the gel was thermally-treated at 600° C. for 5 hours to remove the organic substances from the dried gel. The gel from which the organic substances had been removed was heated to 1,000° C. at a rate of 100° C,/hour for glassification. Here, the glassification was performed under a chlorine gas atmosphere to remove hydroxy groups.

Lastly, the resultant was heated to 1,400° C. at a rate of 100° C./hour under a helium gas atmosphere, and the gel was sintered at that temperature for 4 hours, thereby forming a silica glass tube.

EXAMPLE 2

12.0 wt % of acryl amide and 0.5 wt % of N,N'-methylenebisacrylamide were dissolved in 87.5 wt % of deionized water to prepare a premix solution.

2,000 ml of the premix solution, 2,000 g of the fumed silica (Aerosil OX-50, Degussa Co.) and 222 ml of TMAH aqueous solution (25.0 wt % solution in water) were mixed and dispersed using a high shear mixer to prepare a sol. Then, air bubbles were removed from the sol using a vacuum pump, and aged for 15 hours. 24 ml of ammonium persulfate aqueous solution (25.0 wt % solution in water) as a polymerization initiator, and 6 ml of TEMED as a catalyst were added to and mixed with the aging-treated sol.

The mixture was poured into a mold for gelation. After 60 minutes, the obtained moist gel was demolded, and dried in an incubator at 25° C. and 75% RH for 6 days. Then, the gel was heated to 120° C. at a rate of 10° C. per hour, and maintained at that temperature for 5 hours to remove the remaining moisture, thereby forming a dried gel.

Then, after heating the dried gel to 550° C. at a rate of 50° C./hour, the dried gel was thermally-treated at 550° C. for 5 hours to remove the organic substances from the dried gel. The gel from which the organic substances had been removed was heated to 1,000° C. at a rate of 100° C./hour, and maintained for 5 hours for glassification. Here, the glassification was performed under a chlorine gas atmosphere to remove hydroxy groups.

Lastly, the resultant was heated to 1,400° C. at a rate of 100° C./hour under a helium gas atmosphere, and the gel was sintered at that temperature for 4 hours, hereby forming a silica glass tube.

EXAMPLE 3

4.8 wt % of acryl amide, 0.2 wt % of N,N'-methylenebisacrylamide were dissolved in 95.0 wt % of deionized water to prepare a premix solution.

1,000 ml of the premix solution, 1,100 g of the fumed silica (Aerosil OX-50, Degussa Co.) and 116 ml of TMAH aqueous solution (25.0 wt % solution in water) were mixed and dispersed using a high shear mixer to prepare a sol.

Then, air bubbles were removed from the sol using a vacuum pump, and aged for 15 hours. 14 ml of ammonium persulfate aqueous solution (5.0 wt % solution in water) as a polymerization initiator, and 3 ml of TEMED as a catalyst were added to and mixed with the aged sol.

The mixture was poured into a mold for gelation. After 60 minutes, the obtained moist gel was demolded, and dried in an incubator at 25° C. and 75% RH for 6 days. Then, the gel was heated to 120° C. at a rate of 20° C. per hour, and maintained at that temperature for 5 hours to remove the remaining moisture, thereby forming a dried gel.

Then, after heating the dried gel to 550° C. at a rate of 50° C./hour, the gel was thermally-treated at 550° C. for 5 hours to remove the organic substances from the dried gel. The gel from which the organic substances had been removed was heated to 1,000° C. at a rate of 100° C./hour, and maintained at that temperature for 5 hours for glassification. Here, the glassification was performed under a chlorine gas atmosphere to remove hydroxy groups.

Lastly, the resultant was heated to 1,450° C. at a rate of 100° C./hour under a helium gas atmosphere, and the gel was sintered at that temperature for 4 hours, thereby forming a silica glass tube.

EXAMPLE 4

4.8 wt % of acryl amide, 0.2 wt % of N,N'-methylenebisacrylamide were dissolved in 95.0 wt % of deionized water to prepare a premix solution.

500 ml of the premix solution, 500 g of the fumed silica (Aerosil OX-50, Degussa Co.) and 52 ml of TMAH aqeous solution (25.0 wt % solution in water) were mixed and dispersed using a high shear mixer to prepare a sol. Then, air bubbles were removed from the sol using a vacuum pump, and aged for 10 hours. 8 ml of ammonium persulfate aqueous solution (5.0 wt % solution in water) as a polymerization initiator, 2 ml of TEMED as a catalyst and 8 g of methyl formate (1.6 wt % based on the weight of the silica) were added to and mixed with the aging-treated sol.

The mixture was poured into a mold for gelation. After 60 minutes, the obtained moist gel was demolded, and dried in an incubator at 25° C. and 75% RH for 6 days. Then, the gel was heated to 120° C. at a rate of 20° C. per hour, and maintained at that temperature for 5 hours to remove the remaining moisture, thereby forming a dried gel.

Then, after heating the dried gel to 550° C. at a rate of 50° C./hour, the gel was heated at 550° C. for 5 hours to remove the organic substances from the dried gel. The gel from which the organic substances had been removed was heated to 1,000° C. at a rate of 100° C./hour, and maintained at that temperature for 5 hours for glassification. Here, the glassification was performed under a chlorine gas atmosphere to remove hydroxy groups.

Lastly, the resultant was heated to 1,400° C. at a rate of 100° C./hour under a helium gas atmosphere, and the gel was sintered at that temperature for 4 hours, thereby forming a silica glass tube.

EXAMPLE 5

A silica glass tube was manufactured by the same method as described in Example 4, except that methyl lactate was used instead of methyl formate.

EXAMPLE 6

A silica glass tube was manufactured by the same method as described in Example 4, except that ethyl lactate was used instead of methyl formate.

EXAMPLE 7

2.2 wt % of methacryl amide, 0.13 wt % of N,N'-methylenebisacrylamide were dissolved in 96.67 wt % of deionized water to prepare a premix solution.

500 ml of the premix solution, 500 g of the fumed silica (Aerosil OX-50, Degussa Co.) and 52 ml of TMAH aqueous solution (25.0 wt % solution in water)were mixed and dispersed using a high shear mixer to prepare a sol.

Then, air bubbles were removed from the sol using a vacuum pump, and aged for 10 hours. 8 ml of ammonium persulfate aqueous solution (5.0 wt % solution in water) as a polymerization initiator, 2 ml of TEMED as a catalyst and 8 g of methyl formate (1.6 wt % based on the weight of silica) were added to and mixed with the aged sol. Then, the obtained mixture was poured into a mold for gelation into an intended shape.

After gelation, the obtained moist gel was demolded, and dried in an incubator at 30° C. and 90% RH for 10 days. Then, the gel heated to 700° C. at a rate of 50° C. per hour, and maintained at that temperature for 4 hours. Then, after heating the dried gel to 1,100° C. at a rate of 100° C./hour, the dried gel was thermally-treated at 1,100° C. for 5 hours. Here, the thermally-treating process was performed under a chlorine gas atmosphere to remove the remaining hydroxy groups.

Lastly, the resultant was heated to 1,500° C. at a rate of 100° C./hour under a helium gas atmosphere, and the gel was sintered at that temperature for 5 hours, thereby forming a silica glass tube.

EXAMPLE 8

A silica glass tube was manufactured by the same method as described in Example 7, except that 10 g of ethyl lactate was used instead of methyl formate.

EXAMPLE 9

14.0 wt % of methacryl amide, 0.6 wt % of N,N'-methylenebisacrylamide were dissolved in 85.4 wt % of deionized water to prepare a premix solution.

500 ml of the premix solution, 500 g of the fumed silica (Aerosil OX-50, Degussa Co.) and 52 ml of TMAH aqueous solution (25.0 wt % solution in water)were mixed and dispersed using a high shear mixer to prepare a sol.

Then, air bubbles were removed from the sol using a vacuum pump, and aged for 15 hours. 6 ml of ammonium persulfate aqueous solution (5.0 wt % solution in water) was added to the aged sol, and air bubbles were removed from the reaction mixture. Then, 2 ml of TEMED as a catalyst was added to and mixed with the reaction mixture. Then, the obtained mixture was poured into a mold for gelation into an intended shape.

After gelation, the obtained moist gel was demolded, and dried in an incubator at 35° C. and 70% RH for 4 days. Then, the resultant was heated to 100° C. at a rate of 10° C. per hour, and maintained at that temperature for 10 hours to remove the remaining moisture.

Then, after heating the dried gel to 600° C. at a rate of 50° C./hour, the dried gel was thermally-treated at 600° C. for 5 hours. Then, the gel was heated to 1,000° C. at a rate of 100° C./hour, and maintained at that temperature for 5 hours. Here, the thermally treating process was performed under a chlorine gas atmosphere to remove the remaining hydroxy groups.

Lastly, the resultant was heated to 1,400° C. at a rate of 100° C./hour under a helium gas atmosphere, and the gel was sintered at that temperature for 4 hours, thereby forming a silica glass tube.

EXAMPLE 10

12.0 wt % of methacryl amide, 5.0 wt % of N,N'-methylenebisacrylamide were dissolved in 83.0 wt % of deionized water to prepare a premix solution.

2,000 ml of the premix solution, 2,000 g of the fumed silica (Aerosil OX-50, Degussa Co.) and 222 ml of TMAH aqueous solution (25.0 wt % solution in water) were mixed and dispersed using a high shear mixer to prepare a sol.

Then, air bubbles were removed from the sol using a vacuum pump, and aged for 15 hours. 24 ml of ammonium persulfate aqueous solution (5.0 wt % solution in water) was added to the aged sol, and air bubbles were removed from the reaction mixture. Then, 6 ml of TEMED as a catalyst was added to and mixed with the reaction mixture. Then, the obtained mixture was poured into a mold for gelation into an intended shape.

After gelation, the obtained moist gel was demolded, and dried in an incubator at 25° C. and 75% RH for 6 days. Then, the resultant was heated to 120° C. at a rate of 10° C. per hour, and maintained at that temperature for 10 hours to remove the remaining moisture.

Then, after heating the dried gel to 550° C. at a rate of 50° C./hour, the dried gel was thermally-treated at 550° C. for 5 hours. Then, the gel was heated to 1,000° C. at a rate of 100° C./hour, and maintained at that temperature for 5 hours. Here, thermally treating process was performed under a chlorine gas atmosphere to remove the remaining hydroxy groups.

Lastly, the resultant was heated to 1,400° C. at a rate of 100° C./hour under helium gas atmosphere, and the gel was sintered at that temperature for 4 hours, thereby forming a silica glass tube.

EXAMPLE 11

4.8 wt % of methacryl amide, 0.2 wt % of N,N'-methylenebisacrylamide were dissolved in 95.0 wt % of deionized water to prepare a premix solution.

1,000 ml of the premix solution, 1,100 g of the fumed silica (Aerosil OX-50, Degussa Co.) and 116 ml of TMAH aqueous solution (25.0 wt % solution in water) were mixed and dispersed using a high shear mixer to prepare a sol.

Then, air bubbles were removed from the sol using a vacuum pump, and left for aging for 15 hours. 14 ml of ammonium persulfate aqueous solution (5.0 wt % solution in water) was added to the aged sol, and the air bubbles were removed from the reaction mixture. Then, 3 ml of TEMED as a catalyst was added to and mixed with the reaction mixture. Then, the obtained mixture was poured into a mold for gelation into an intended shape.

After 60 minutes, the obtained moist gel was demolded, and dried in an incubator at 25° C. and 75% RH for 6 days. Then, the resultant was heated to 120° C. at a rate of 20° C. per hour, and maintained at that temperature for 5 hours to remove the remaining moisture.

Then, after heating the dried gel to 550° C. at a rate of 50° C./hour, the dried gel was thermally-treated at 550° C. for 5 hours. Then, the gel was heated to 1,000° C. at a rate of 100° C./hour, and maintained at that temperature for 5 hours. Here, thermally-treating process was performed under a chlorine gas atmosphere to remove the remaining hydroxy groups.

Lastly, the resultant was heated to 1,450° C. at a rate of 100° C./hour under a helium gas atmosphere, and the gel was sintered at that temperature for 4 hours, thereby forming a silica glass tube.

The strength of the gels manufactured by Examples 1 through 11 was evaluated. In view of the result, strength of the gel was found to have increased, thereby facilitating handing of the gel.

Also, it was observed whether cracks and shrinking of the silica glass tubes manufactured by Examples 1 through 11 were generated.

In the silica glass tubes manufactured by Examples 1 through 11, cracking after drying and shrinking decreased.

In the silica glass fabrication method according to the present invention, a high purity silica glass tube, in which cracking after drying rarely occurs and shrinking is markedly low, can be obtained. Also, a large silica glass tube can be manufactured by this fabrication method.

The silica glass obtained by the fabrication method according to the present invention can be applied to silica glass suitable for semiconductor devices, an optical lens and so on as well as for an optical fiber preform.

What is claimed is:

1. A method for fabricating silica glass comprising the steps of:

(a) adding silica and a dispersant to a premix solution to form a mixed solution, the premix solution obtained by dissolving an acrylic resin monomer and a cross-linking agent in distilled water, dispersing the mixed solution, and adjusting the pH of the mixed solution, to form a sol;

(b) removing air bubbles from the sol, and then aging the resultant sol;

(c) adding a polymerization initiator and a catalyst to the aged sol to form a reaction mixture, and adjusting the pH of the reaction mixture;

(d) pouring the reaction mixture into a mold, and then gelating the reaction mixture;

(e) aging the obtained gel;

(f) demolding the aged gel, and then drying the demolded gel;

(g) thermally-treating the dried gel to remove organic substances from the gel; and (h) eliminating hydroxy groups in, and sintering the gel from which organic substances have been removed.

2. The method of claim 1, wherein in the step (c) a gelling agent is further added in addition to the polymerization initiator and the catalyst.

3. The method of claim 2, wherein the gelling agent is at least one compound selected from the group consisting of methyl formate, methyl lactate and ethyl lactate.

4. The method of claim 1, wherein the content of the acrylic resin monomer is 2~20 wt % based on the weight of the premix solution.

5. The method of claim 1, wherein the content of the cross-linking agent is 0.05~1.0 wt % based on the weight of the premix solution.

6. The method of claim 1, wherein the acrylic resin monomer is at least one compound selected from the group consisting of acryl amide and methacryl amide, and the cross-linking agent is N,N'-methylenebisacrylamide.

7. The method of claim 1, wherein a mixing ratio of the silica and the premix solution is 4:6~6:4 based on weight.

8. The method of claim 1, wherein the catalyst is N,N,N',N'-tetramethylenediamine.

9. The method of claim 1, wherein the polymerization initiator is ammonium persulfate.

* * * * *